(12) United States Patent
Huang (10) Patent No.: US 7,719,604 B2
(45) Date of Patent: May 18, 2010

(54) ABERRATION COMPENSATION SYSTEM FOR DIGITAL CAMERA AND METHOD THEREFOR

(75) Inventor: Yu-Cheng Huang, Hsinchu County (TW)

(73) Assignee: Altek Corporation, Hsinchu (TW)

( * ) Notice: Subject to any disclaimer, the term of this patent is extended or adjusted under 35 U.S.C. 154(b) by 614 days.

(21) Appl. No.: 11/647,215

(22) Filed: Dec. 29, 2006

(65) Prior Publication Data

US 2008/0100737 A1    May 1, 2008

(30) Foreign Application Priority Data

Nov. 1, 2006   (TW) .............................. 95140446 A (51) Int. Cl.
*G03B 13/00* (2006.01)
(52) U.S. Cl. .................. 348/345; 348/335; 348/357
(58) Field of Classification Search .................. None
See application file for complete search history.

(56) References Cited

U.S. PATENT DOCUMENTS

| | | | |
|---|---|---|---|
| 5,745,175 A * | 4/1998 | Anderson | 348/345 |
| 5,838,374 A * | 11/1998 | Kikuchi | 348/351 |
| 6,717,331 B1 * | 4/2004 | Lan et al. | 310/323.02 |
| 2005/0129327 A1 * | 6/2005 | Hillis et al. | 382/255 |
| 2006/0146173 A1 * | 7/2006 | Arimoto et al. | 348/345 |
| 2006/0291844 A1 * | 12/2006 | Kakkori | 396/89 |

* cited by examiner

*Primary Examiner*—David L Ometz
*Assistant Examiner*—Angel L Garces-Rivera
(74) *Attorney, Agent, or Firm*—Birch, Stewart, Kolasch & Birch, LLP (57) ABSTRACT

An aberration compensation system for digital camera and a method therefor are provided, wherein the system includes an optical lens, an axial moving mechanism, a photosensitive element, and an image unit. The photosensitive element is loaded on the axial moving mechanism, and generates a first and a second image at a first and a second focus position. After receiving the first and second images, the image unit respectively calculates a first and a second image capture region and then synthesizes the two regions into a third image. The method includes using the optical lens to project the light beams of an object to be shot, generating the first image and second images, and capturing the distinct portions of the first and second images to be synthesized into the third image. Thereby, the system and method can solve the non-uniformity of the definitions at the center and periphery of each image.

17 Claims, 6 Drawing Sheets

ABERRATION COMPENSATION SYSTEM FOR DIGITAL CAMERA AND METHOD THEREFOR

CROSS-REFERENCE TO RELATED APPLICATIONS

This non-provisional application claims priority under 35 U.S.C. §119(a) on Patent Application No(s). 095140446 filed in Taiwan, R.O.C. on Nov. 1, 2006, the entire contents of which are hereby incorporated by reference.

BACKGROUND OF THE INVENTION

1. Field of the Invention

The present invention relates to an image processing system and a method therefor, and more particularly to an image aberration compensation system for digital camera and a method therefor.

2. Related Art

The basic imaging principle of a digital camera (DC) is similar to that of a conventional camera. The DC and the conventional camera both have an optical lens set including at least one lens, which projects the light beams of an object to be shot onto a photosensitive material inside the camera according to an optical principle of pinhole imaging. The photosensitive material of a conventional camera is, for example, film (or referred to as negative film); while a DC adopts, for example, charge coupled device (CCD) or complementary metal-oxide-semiconductor (CMOS) as photosensitive materials (all-together referred to as photosensitive element below). The photosensitive element of a DC can convert the image shot by the optical lens set into digital signals, and the digital signals are stored in a storage medium (for example, a flash memory card or a built-in storage medium) after being processed by an electronic circuit. Different from the conventional camera, the image of the DC is stored in a digital mode, so the shot image can be modified through digital signal processing, for example, by a digital signal processor (DSP) to eliminate the noises of the image or adjust the contrast, chroma of the image.

Figure 1:
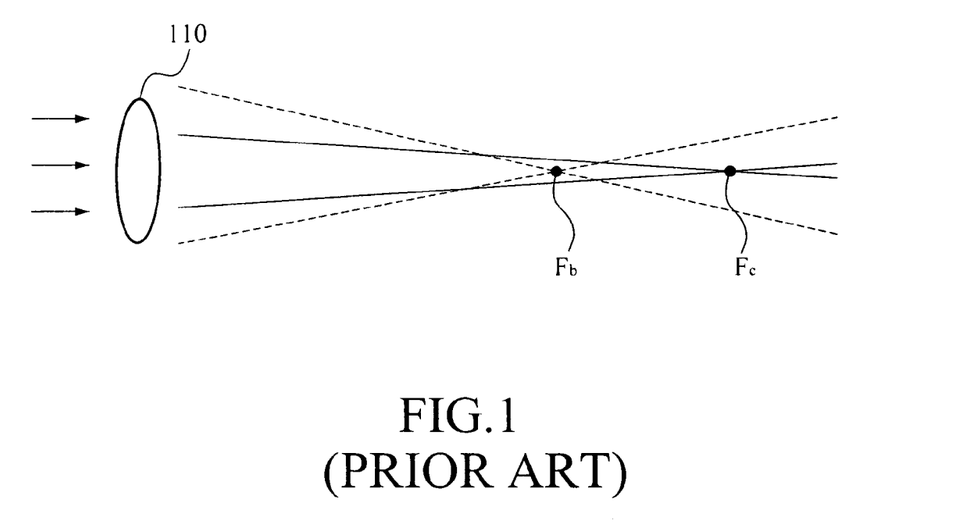
FIG. 1 is a schematic view of the aberration of a conventional spherical lens.

The lenses adopted by the optical lens set of the DC are the same as those of the conventional camera, wherein the lens can be classified into, for example, spherical lens or aspheric lens. FIG. 1 is a schematic view of the aberration of a conventional spherical lens 110. Referring to FIG. 1, the light beam refractive angles at the periphery of the spherical lens 110 may deviate from the normal focal length along with the surface angles of the spherical lens 110 (i.e., cannot be concentrated on the focus). The distance between a focus $F_c$ of the refracted light beams at the center of the spherical lens 110 and a focus $F_b$ of the refracted light beams at the periphery of the spherical lens 110 is referred to as an aberration distance. In general, the aberration distance of a spherical lens varies with the surface angles of the spherical lens. The larger the aberration distance of a spherical lens is, the more apparent aberration the shot image may have. The so-called aberration refers to the problem of a shot image that the center of the image is distinct but the periphery (or a portion of the image) is obscure. Such problem is generally seen in optical lens set adopting a spherical lens. To alleviate the above problem, a method of, for example, using a plurality of spherical lenses to eliminate aberration can be employed. However, the overall transmittance, sharpness of such optical lens set and the contrast, definition of the shot image may be alleviated as the number of the spherical lenses is increased. In addition, the increase of the number of the spherical lenses represents the increase of the volume of the optical lens set and the raise of the fabrication cost of the optical lens set. Therefore, at present, a portion of the optical lens set is replaced by aspheric lenses to avoid the aforementioned aberration problem of a spherical lens. Being specially designed, the surface angles of an aspheric lens can make the center of the lens have the same focal length as the periphery region (i.e., imaging at a normal focal length). However, as the processing cost and technology of an aspheric lens are much higher than those of a spherical lens, the fabrication cost of the aspheric lens is much higher than that of the spherical lens. Moreover, the adoption of an aspheric lens still cannot solve the aberration problem caused by different object distances.

SUMMARY OF THE INVENTION

To solve the above problems, the present invention is directed to providing an aberration compensation system for digital camera (DC) and a method therefor, wherein the distinct capture regions in two or more images are synthesized to make the definition at the center of the shot image conform to the definition at the periphery, thus solving the aforementioned aberration problem caused by the optical lens.

To achieve the above object, the present invention implements from two aspects, i.e., system and method. The aberration compensation system for DC disclosed by the present invention comprises an optical lens, an axial moving mechanism set, a photosensitive element set, and an image unit set. The optical lens is used to project the light beams of an object to be shot. With the center of the optical lens as an axis, the axial moving mechanism moves back and forth between a first focus position corresponding to the light beams at the axial center and a second focus position corresponding to the light beams at the axial periphery. The photosensitive element is loaded on the axial moving mechanism, for generating a first image at the first focus position and a second image at the second focus position. The image unit is used to receive the first and second images, respectively calculate a first image capture region corresponding to the first image and a second image capture region corresponding to the second image, and synthesize the first image capture region and the second image capture region into a third image.

According to a preferred embodiment of the aberration compensation system for DC in the present invention, the optical lens is a spherical lens or an aspheric lens.

According to a preferred embodiment of the aberration compensation system for DC in the present invention, the axial moving mechanism further comprises a transmission shaft set, a platform, a drive motor, and a trigger sensor. The drive motor is an ultrasonic motor. The trigger sensor is a piezoelectric sensor, and is used to trigger the operation of the drive motor, so as to drive the platform to move on the transmission shaft.

According to a preferred embodiment of the aberration compensation system for DC in the present invention, the photosensitive element is CMOS or CCD.

The aberration compensation method of DC disclosed by the present invention comprises: first, using an optical lens to project the light beams of an object to be shot; then, using a photosensitive element set to receive the light beams refracted by the optical lens at a first focus position corresponding to the light beams at the axial center projected by the optical lens, so as to generate a first image; next, moving the photosensitive element to a second focus position corresponding to the light beams at the axial periphery projected by the optical lens to receive the light beams refracted by the optical lens, so as to generate a second image; afterward, respectively calculating a first image capture region corresponding to the first image and a second image capture region corresponding to the second image according to the first focus position and the second focus position; and finally, capturing the first image capture region of the first image and the second image capture region of the second image and synthesizing the two regions into a third image.

According to a preferred embodiment of the aberration compensation method of DC in the present invention, the step of respectively calculating the first image capture region corresponding to the first image and the second image capture region corresponding to the second image according to the first focus position and the second focus position further comprises: first, calculating a first distinct curve of the first image; then, obtaining the distinct region of the first image with reference to the aberration distance and the first distinct curve; next, calculating a second distinct curve of the second image; afterward, obtaining the distinct region of the second image with reference to the aberration distance and the second distinct curve; and finally, capturing the distinct regions of the first and second images and synthesizing the two regions into the third image.

According to a preferred embodiment of the aberration compensation method of DC in the present invention, the method further comprises performing an image correction step on the first and second images before capturing the first image capture region of the first image and the second image capture region of the second image and synthesizing the two regions into the third image. The image correction step comprises: first, picking up at least one first characteristic of the first image; then, picking up at least one second characteristic of the second image; next, comparing the coordinates of the first characteristics and the second characteristics; and finally, if the coordinate of at least one characteristic is different, correcting the position of the second image to make the coordinates of the second characteristics identical to those of the first characteristics.

The features and practice of the preferred embodiments of the present invention will be illustrated in detail below with the accompanying drawings. Those skilled in the arts can easily understand and implement the content of the present invention. Furthermore, the relative objectives and advantages of the present invention are apparent to those skilled in the arts with reference to the content disclosed in the specification and drawings.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

The object and implementation of the present invention are illustrated in detail in the following preferred embodiments. However, the concept of the present invention can be applied to other scopes. The embodiments listed below are only used to illustrate the objective and implementation of the present invention, instead of limiting the scope thereof.

The present invention first provides an aberration compensation system for digital camera (DC), so as to solve the aberration problem that the definition at the periphery of an image obtained by shooting an object with a DC does not conform to the definition at the center of the image.

Figure 2:
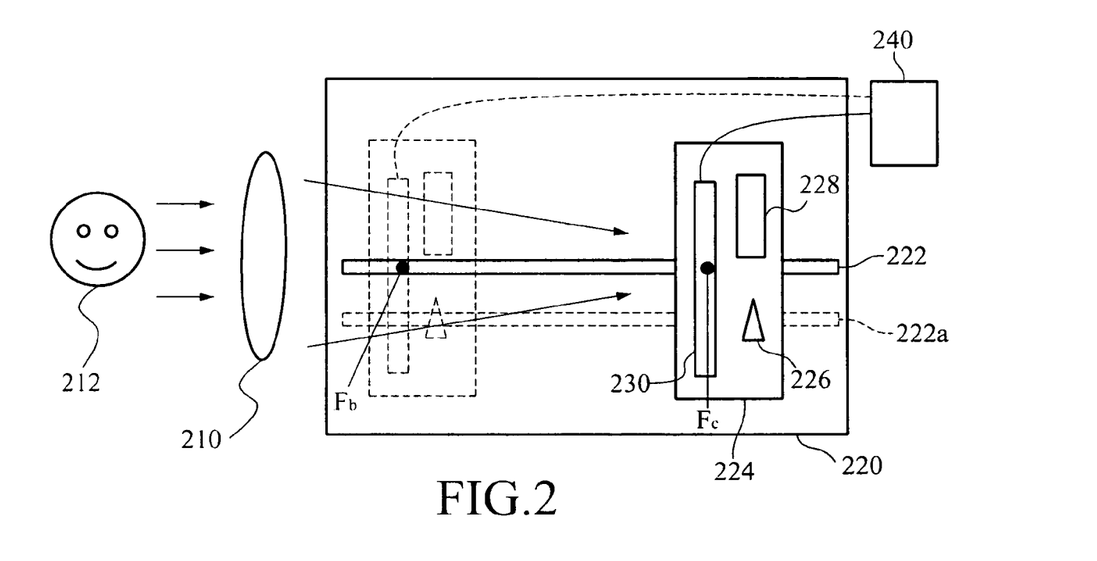
FIG. 2 is a schematic view of an aberration compensation system for DC according to the present invention.

FIG. 2 is a schematic view of an aberration compensation system for DC according to an embodiment of the present invention. Referring to FIG. 2, in this embodiment, the aberration compensation system for DC includes an optical lens 210, an axial moving mechanism 220, a photosensitive element 230, and an image unit 240. Next, the function of each component is described below. The light beams of an object 212 to be shot are projected onto the photosensitive element 230 through the optical lens 210. With the center of the optical lens 210 as an axis, the axial moving mechanism 220 moves back and forth between a first focus position $F_c$ corresponding to the light beams at the axial center and a second focus position $F_b$ corresponding to the light beams at the axial periphery. The photosensitive element 230 loaded on the axial moving mechanism 220 is moved to different focus positions along with the axial moving mechanism 220. When the photosensitive element 230 is moved to the first focus position $F_c$, a first image is generated, and when the photosensitive element 230 is moved to the second focus position $F_b$, a second image is generated. The above two images may be transmitted to the image unit 240 for image processing. After receiving the first image and the second image, the image unit 240 respectively calculates a first image capture region corresponding to the first image and a second image capture region corresponding to the second image. After the calculation, the image unit 240 synthesizes the first image capture region and the second image capture region into a third image.

The detailed structure of the aberration compensation system for DC of the present invention is further illustrated. The axial moving mechanism 220 enables the photosensitive element 230 to respectively generate the first image and the second image at the first focus position $F_c$ and the second focus position $F_b$. The axial moving mechanism 220 includes a transmission shaft 222, a platform 224, a drive motor 226, and a trigger sensor 228. In this embodiment, the drive motor 226 is, for example, an ultrasonic motor, the trigger sensor 228 is, for example, a piezoelectric sensor, and the above two components are both loaded on the platform 224. When a user presses the shutter button, the trigger sensor 228 detects the pressing action and triggers the operation of the drive motor 226, so as to drive the platform 224 to move on the transmission shaft 222. In this embodiment, the transmission shaft 222 is disposed on a central axis of the optical lens 210 (for example, the position of the transmission shaft 222 in FIG. 2). However, in some embodiments, the transmission shaft 222a is disposed on a central axis deviated from the optical lens 210. In the present invention, the transmission shaft 222 can be disposed on a central axis parallel to the optical lens 210, and the position of the transmission shaft 222 is not limited herein. The photosensitive element 230 is disposed on the platform 224 and transmits the first image or the second image to the image unit 240 through a transmission line connected to the image unit 240. The image unit 240 is, for example, a digital signal process (DSP) unit, for calculating the distinct regions of the first and second images (i.e., the first image capture region and the second image capture region), and synthesizing the two regions into a third image.

It should be noted that, the optical lens 210 is, for example, a spherical lens or an aspheric lens. The drive motor 226 is, for example, an ultrasonic motor. The trigger sensor 228 is, for example, a piezoelectric sensor. The photosensitive element 230 is, for example, a CMOS or CCD. In addition, the scope is not limited herein.

Figure 3:
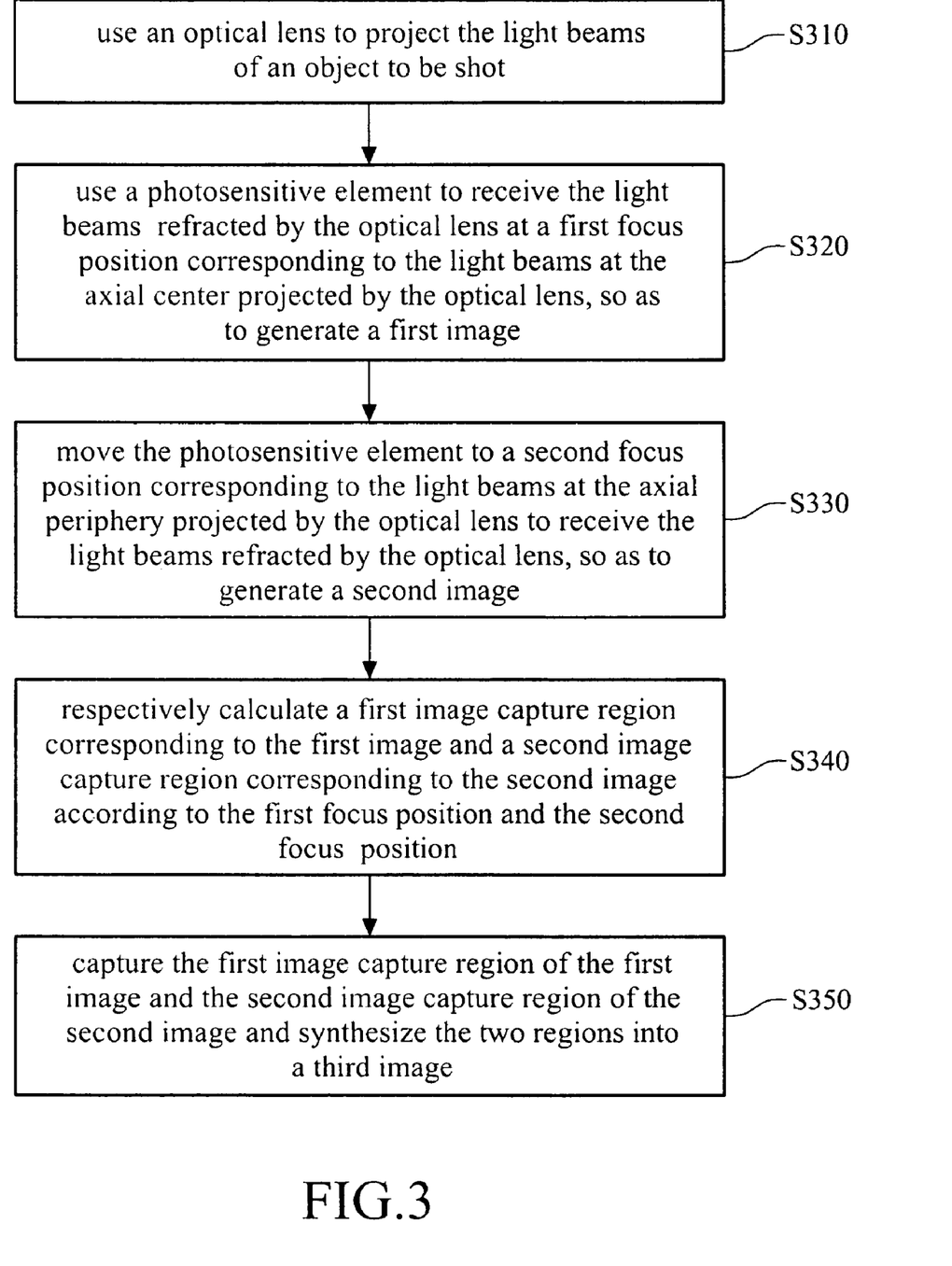
FIG. 3 is a flow chart of an aberration compensation method of DC according to the present invention.

Next, the aberration compensation method for DC provided by the present invention is illustrated. FIG. 3 is a flow chart of the aberration compensation method for DC according to the present invention. Referring to FIGS. 2 and 3 alternatively, the aberration compensation method for DC in this embodiment includes the following steps. First, an optical lens 210 is used to project the light beams of an object to be shot (Step S310), wherein the optical lens 210 can be a spherical lens or an aspheric lens, and the light beams are concentrated at the focus for imaging through the optical lens 210. Then, the photosensitive element 230 receives the light beams refracted by the optical lens 210 at a first focus position $F_c$ corresponding to the light beams at the axial center of the optical lens 210, so as to generate a first image (Step S320). Next, the photosensitive element 230 is moved to a second focus position $F_b$ corresponding to the light beams at the axial periphery projected by the optical lens 210 to receive the light beams refracted by the optical lens 210, so as to generate a second image (Step S330). As mentioned above, a trigger sensor 228, for example, a piezoelectric sensor can be used in the system to detect whether the drive motor 226 (for example, an ultrasonic motor) should be triggered, wherein the drive motor 226 drives the photosensitive element 230 to move to the second focus position $F_b$ after being triggered. By the way, the light beams at the axial center refer to light beams penetrating the central axis of the optical lens 210. Accordingly, the light beams at the axial periphery relative to the light beams at the axial center refer to light beams penetrating the periphery of the optical lens 210. As the surface of the optical lens 210 has certain radian and the thickness at the center of the optical lens 210 defers from that at the periphery thereof, the light beams at the axial center and the axial periphery may be refracted to different focus positions. Thus, the photosensitive element 230 acquires different images at those focus positions. Afterward, the image unit 240 respectively calculates a first image capture region corresponding to the first image and a second image capture region corresponding to the second image according to the first focus $F_c$ position and the second focus $F_b$ position (Step S340). Finally, the first image capture region of the first image and the second image capture region of the second image are captured and then synthesized into a third image (Step S350).

Figure 4A:
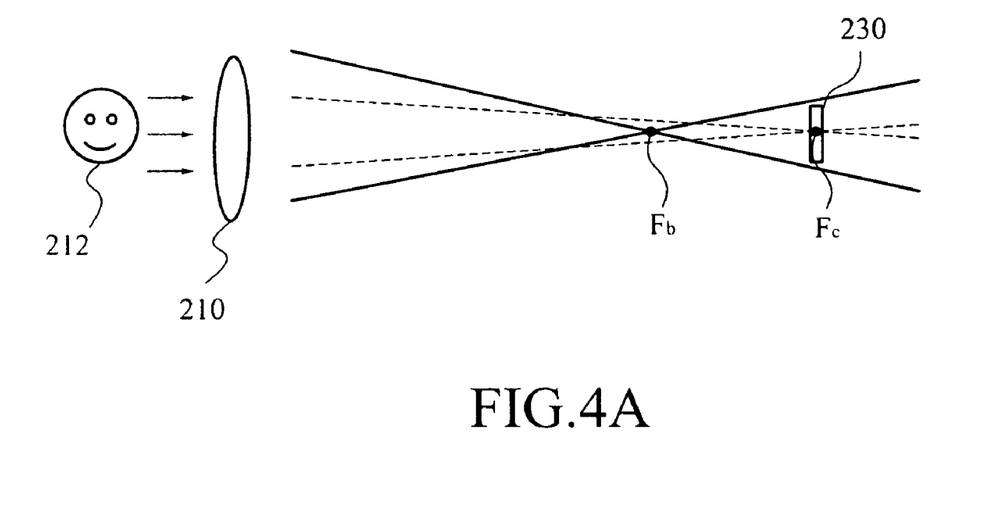
FIG. 4A is a schematic view of generating the first image according to the present invention.
Figure 4B:
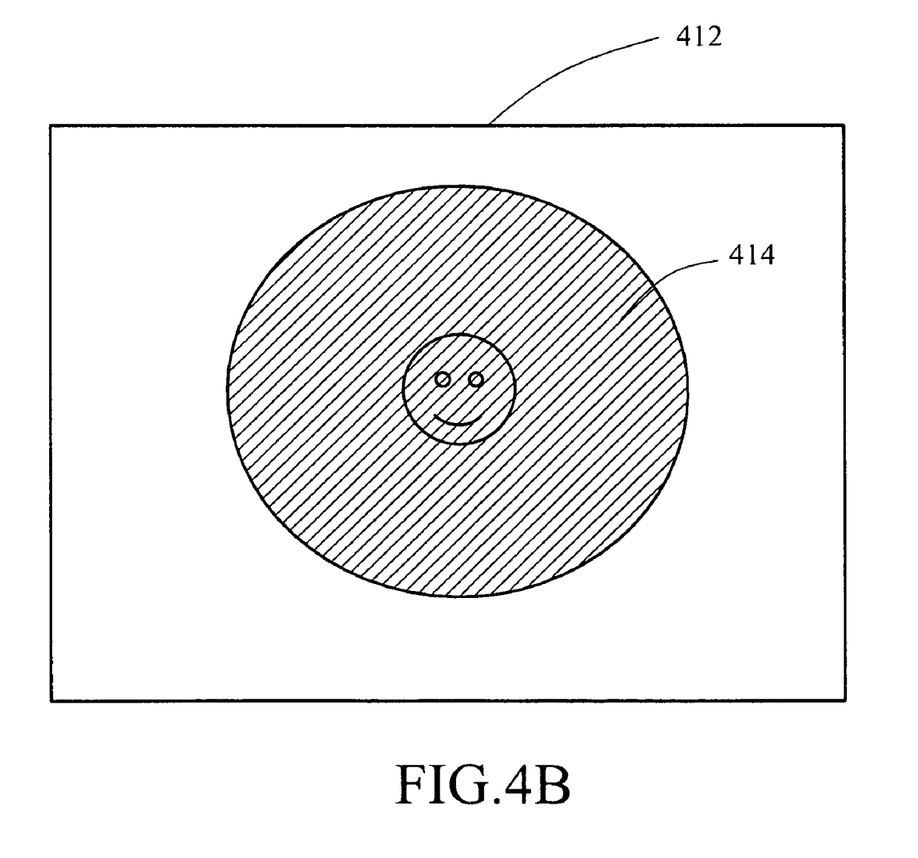
FIG. 4B is a schematic view of the first image capture range according to the present invention.

The light beams penetrating the optical lens 210 may be refracted to different focus positions, thus causing a significant difference between the definitions at the center and the periphery of an image generated by the photosensitive element 230. In this paragraph, the image differences near the center and the periphery of the first image are explained with reference to FIGS. 4A and 4B. FIG. 4A is a schematic view of the photosensitive element 230 generating the first image according to the present invention. FIG. 4B is a schematic view of the first image. Referring to FIGS. 4A and 4B at the same time, the light beams at the axial center are concentrated at the first focus position $F_c$ and the light beams at the axial periphery are concentrated at the second focus position $F_b$, and the photosensitive element 230 receives the refracted light beams at the first focus position $F_c$ to generate a first image 412. The closer the light beams are next to the axial center, the nearer the refracted light beams are close to the first focus $F_c$, thus obtaining a relatively distinct image. On the contrary, the imaging of the light beams near the axial periphery may generate an obscure image as the corresponding focus deviates from the first focus $F_c$. In FIG. 4B, a first image capture region 414 represents the distinct region in the first image 412, wherein the distinct region and the selection range thereof can be adjusted according to the aberration caused by the surface angles of the optical lens 210 and the tolerance of a human eye to the definition of the image. The related adjusting method will be generally given later in a paragraph, but the selecting method is not limited by the present invention.

Following the above paragraph, the photosensitive element 230 generates the first image 412 at the first focus position $F_c$, and the light beams at the axial center passing through the optical lens 210 fall on the first focus position $F_c$ after being refracted, thus obtaining a distinct image near the center. On the contrary, the light beams at the axial periphery passing through the optical lens 210 are refracted to the second focus position $F_b$, thus obtaining an obscure image at the periphery region. Generally, the images shot by a general DC all have the above aberration. Therefore, to solve the aberration problem, in the present invention, the photosensitive element 230 is moved to the second focus position $F_b$ to generate a second image after the first image 412 is generated. As the imaging at the periphery of the second image is distinct, the first and second images can be synthesized to acquire a distinct image, so as to solve the aberration problem. The generating method of the second image will be described below with reference to FIGS. 5A and 5B.

Figure 5A:
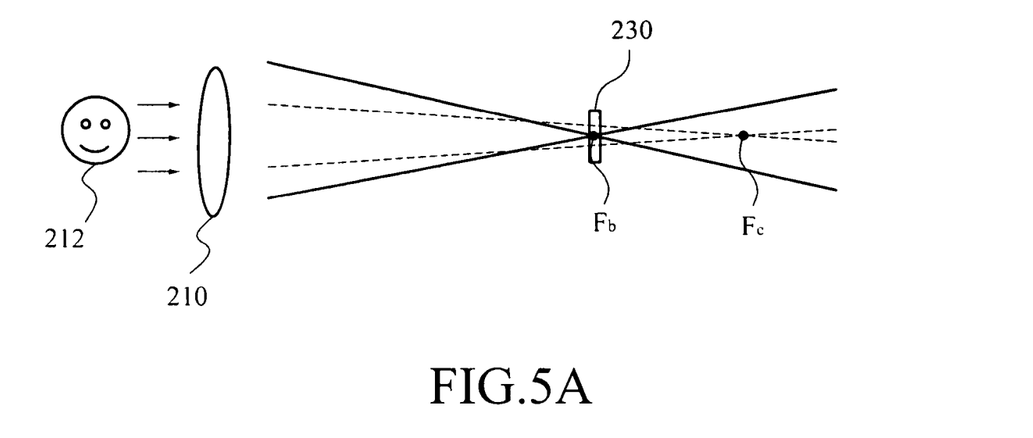
FIG. 5A is a schematic view of generating the second image according to the present invention.
Figure 5B:
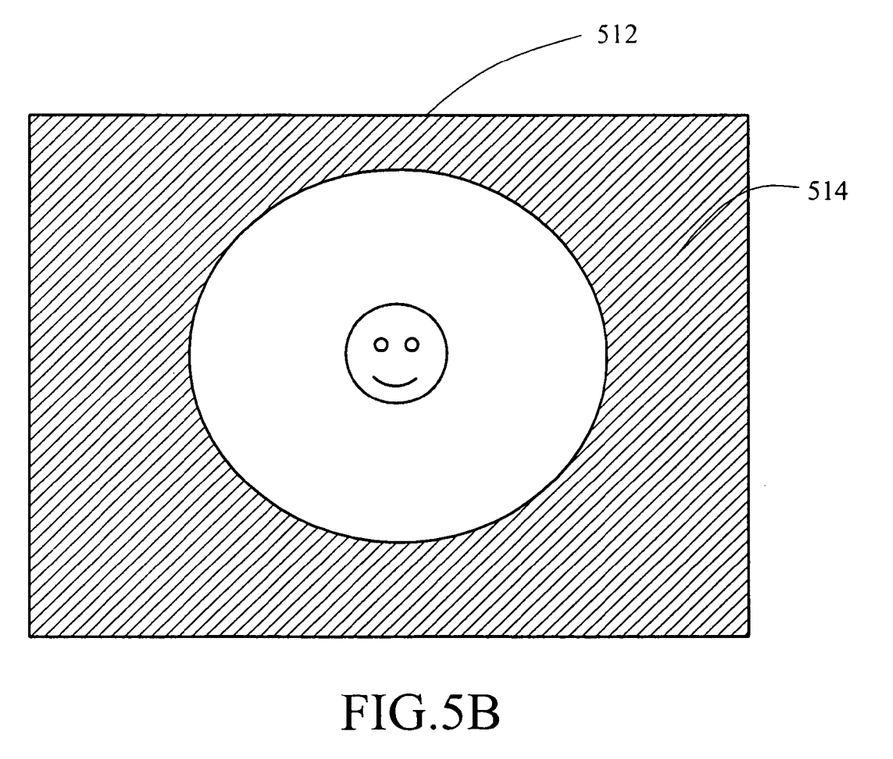
FIG. 5B is a schematic view of the second image capture range according to the present invention.

FIG. 5A is a schematic view of the photosensitive element 230 generating a second image 512 according to the present invention. FIG. 5B is a schematic view of the second image 512. Referring to FIGS. 5A and 5B at the same time, the photosensitive element 230 is moved to the second focus position $F_b$ to generate the second image 512. The second image 512 also has an imaging difference between the center and the periphery, which is similar to that of the first image 412 mentioned above. Seen from FIG. 5A, the light beams near the axial periphery are concentrated on the second focus $F_b$, so when the photosensitive element 230 is moved to the second focus position $F_b$ to generate the second image in FIG. 5B, the region corresponding to the light beams at the axial periphery in the second image may obtain a relatively distinct image. For example, a second image capture region 514 calculated in FIG. 5B is a distinct region of the second image 512.

Figure 6:
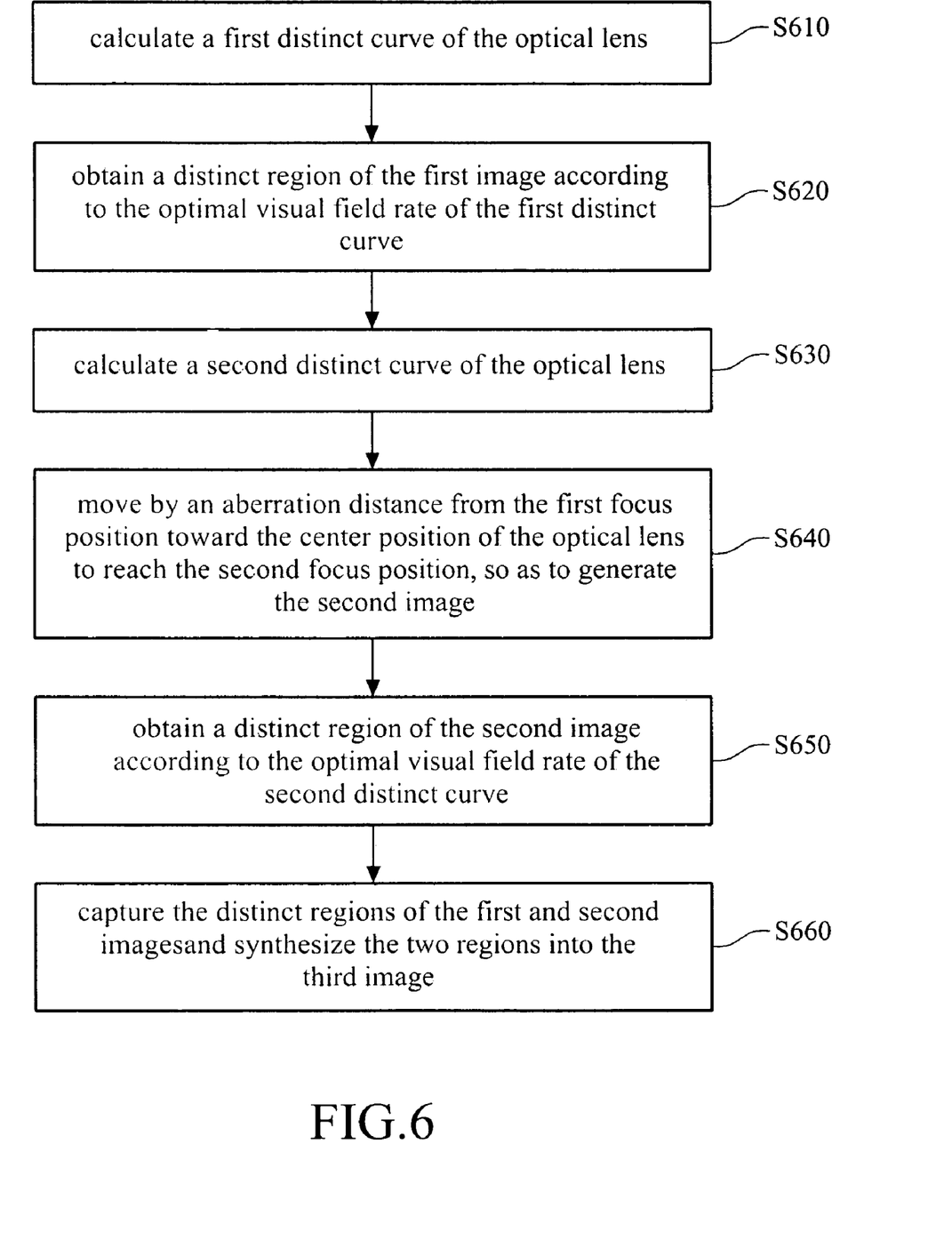
FIG. 6 is a detailed flow chart of Steps S340 and S350 in FIG. 3.

The steps of the capture and synthesis of the distinct images in the first and second images are illustrated below. FIG. 6 is a detailed flow chart of Steps S340 and S350 in FIG. 3. Referring to FIG. 6, first, a first distinct curve of the optical lens 210 is calculated (Step S610). Then, a distinct region of the first image is obtained according to the optimal visual field rate of the first distinct curve (Step S620). Afterward, a second distinct curve of the optical lens is calculated (Step S630). The above first and second distinct curves are, for example, modulation transfer function (MNF) curves. The optical lens calculates the corresponding distinct curve according to the selected visual field rate. The so-called visual field rate is a ratio between the size of the shot image and the practical view-finding size, wherein the larger the visual field rate is, the closer the size of the shot image and the practical view-finding size is. For example, in this embodiment, the first distinct curve is a curve calculated with an optimal visual field rate as 0.8, and the second distinct curve is calculated with an optimal visual field rate as 0.7. Afterward, the photosensitive element 230 is moved from the first focus position toward the center of the optical lens by an aberration distance to reach the second focus position, so as to generate a second image (Step S640). The aberration distance mentioned in Step S640 refers to the distance between the focus position corresponding to the optimal visual field rate of the first distinct curve and the focus position corresponding to the junction of the first and second distinct curves. Then, a distinct region of the second image is obtained according to the optimal visual field rate of the second distinct curve (Step S650). Finally, the distinct region of the first image 412 and the distinct region of the second image 512 are captured and synthesized into a third image (Step S660).

Figure 7:
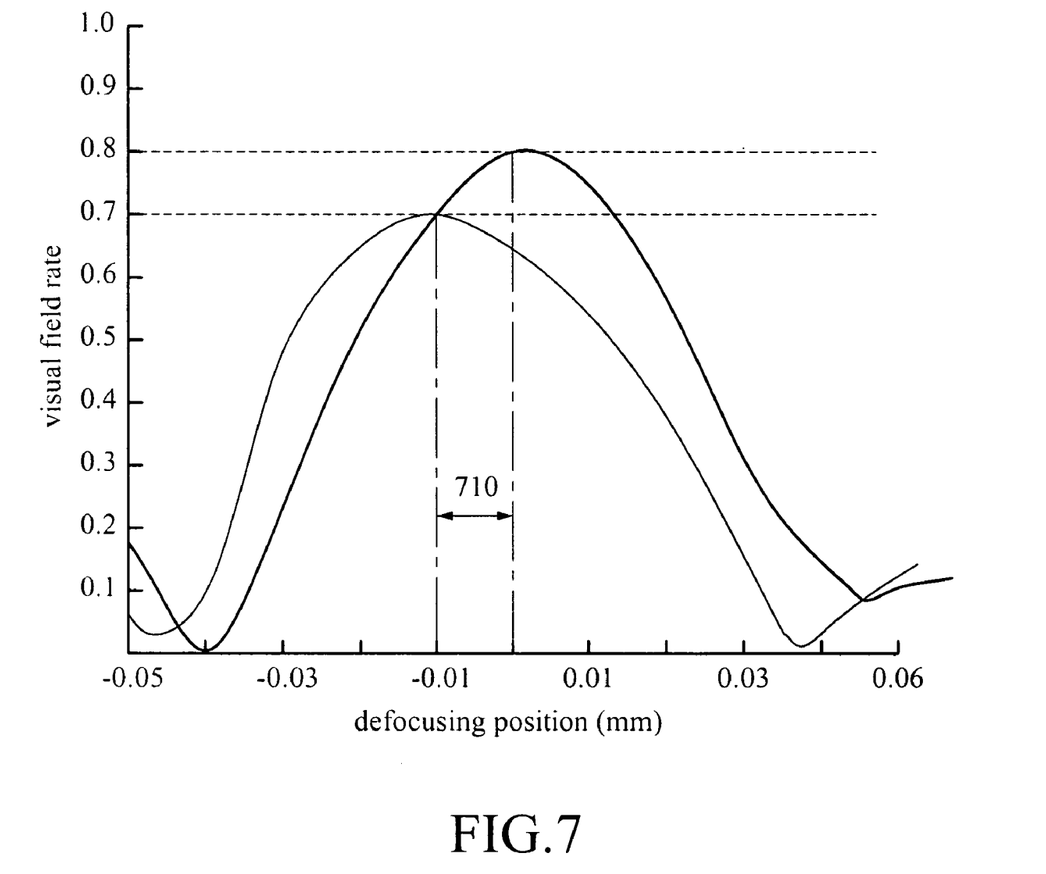
FIG. 7 is a schematic view of a distinct curve of the optical lens according to the present invention.

Further, an example is given to explain the relations between the calculations of the aberration distance and the distinct regions of the first, second images. FIG. 7 is a schematic view of a distinct curve of the optical lens according to the present invention. Referring to FIGS. 5A and 7 at the same time, the optimal visual field rate of the first distinct curve is 0.8, corresponding to a defocusing position of the initial point 0 mm at the X axis in FIG. 7. The optimal visual field rate of the second distinct curve is 0.7, corresponding to a defocusing position of −0.01 mm at the X axis in FIG. 7. In addition, the gap between the above two defocusing positions is the aberration distance 710. After generating the first image at the first focus position $F_c$, the photosensitive element 230 is moved toward the optical lens 210 by an aberration distance 710 to reach the second focus position $F_b$, so as to generate the second image. As for the first image, the periphery is obscure and the center is distinct. As for the second image, the sampling of the distinct region happens to compensate the obscure portions at the periphery of the first image. Therefore, the distinct regions of the first and second images can be synthesized to obtain a third image of an overall distinct region.

In some circumstance, for example, shooting a moving object, after shooting the first image 412, the object to be shot may be out of the visual scope of the lens, and thus the object to be shot cannot be found in the second image 512, or the object to be shot moves to another region of the visual scope, and thus the synthesized third image becomes abnormal, for example, having repeated objects to be shot. Therefore, before the synthesis of the first image 412 and the second image 512, an image correction step must be preformed on the first image 412 and the second image 512, so as to avoid obtaining an abnormal synthesized third image due to the movement of the object to be shot. To solve the above problem, a related image correction method is provided in the next paragraph for performing image correction on the first image 412 and the second image 512. First, the image unit 240 picks up at least one first characteristic from the first image 412. Next, at least one second characteristic is picked up from the second image 512. Finally, the coordinates of the first and second characteristics are compared with each other, wherein if the coordinate of at least one characteristic is different, the coordinate of the second characteristic of the second image 512 is corrected to make the coordinates of the second characteristics identical to those of the first characteristics. An example is given below to illustrate the above step. For example, when shooting a moving pedestrian, first, the photosensitive element 230 generates a first image 412, and then the photosensitive element 230 is moved to shoot a second image 512. The two images are synthesized into a third image. Before synthesis, the image unit 240 picks up the characteristic portions of the first image 412, for example, in the first image 412, the left foot of the pedestrian is ahead of the right foot. After that, the image unit 240 picks up at least one second characteristic from the second image 512, for example, in the second image 512, the left foot of the pedestrian is behind the right foot. Then, the first characteristics and the second characteristics are compared one by one. Thus, it is easy to find that the characteristics of the left foot and right foot of the pedestrian are opposite. Accordingly, it is easy to conclude that the pedestrian is walking. At this time, the image unit 240 may further perform an image correction step to make the coordinate positions of the corresponding characteristics in the first image 412 conform to those in the second image 512. After that, the image unit 240 implements the synthesis step to obtain the third image. In addition, if the second image 512 has a characteristic that cannot be found in the first image 412, the characteristic is kept (or deleted) to make the synthesized third image more real. The technical means concerning image characteristic capture is not limited in the present invention, and those skilled in the art can make appropriate modifications on this part according to their understandings.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An aberration compensation method for digital camera (DC), comprising:

using an optical lens to project light beams of an object to be shot;

using a photosensitive element to receive the light beams refracted by the optical lens at a first focus position corresponding to the light beams at axial center projected by the optical lens, so as to generate a first image;

moving the photosensitive element to a second focus position corresponding to the light beams at axial periphery projected by the optical lens to receive the light beams refracted by the optical lens, so as to generate a second image;

calculating a first distinct curve of the optical lens;

obtaining a distinct region of the first image according to optimal visual field rate of the first distinct curve;

calculating a second distinct curve of the optical lens;

moving by an aberration distance from the first focus position toward center position of the optical lens to reach the second focus position, so as to generate the second image;

obtaining a distinct region of the second image according to optimal visual field rate of the second distinct curve; and capturing the distinct regions of the first and second images, and synthesizing the two distinct regions into the third image.

2. The aberration compensation method for DC as claimed in claim 1, wherein the optical lens is a spherical lens or an aspheric lens.

3. The aberration compensation method for DC as claimed in claim 1, further comprising a step of triggering a drive motor with a trigger sensor, so as to move the photosensitive element to the first focus position or the second focus position.

4. The aberration compensation method for DC as claimed in claim 3, wherein the drive motor is an ultrasonic motor.

5. The aberration compensation method for DC as claimed in claim 1, wherein the trigger sensor is a piezoelectric sensor.

6. The aberration compensation method for DC as claimed in claim 1, wherein the aberration distance is a distance between a focus position corresponding to the optimal visual field rate of the first distinct curve and a focus position corresponding to junction of the first and second distinct curves.

7. The aberration compensation method for DC as claimed in claim 1, wherein the first and second distinct curves are modulation transfer function (MTF) curves.

8. The aberration compensation method for DC as claimed in claim 1, wherein the aberration distance is a distance between a focus position corresponding to the optimal visual field rate of the first distinct curve and a focus position corresponding to junction of the first and second distinct curves; and the first and second distinct curves are modulation transfer function (MTF) curves.

9. The aberration compensation method for DC as claimed in claim 1, wherein the method further comprises performing an image correction step on the first and second images before capturing the first image capture region of the first image and the second image capture region of the second image and synthesizing the image capture two regions into the third image; and the image correction step comprises:
   picking up at least one first characteristic of the first image;
   picking up at least one second characteristic of the second image;
   comparing coordinates of the first characteristics and the second characteristics; and
   correcting position of the second image to make the coordinates of the second characteristics identical to those of the first characteristics if the coordinate of at least one characteristic is different.

10. The aberration compensation method for DC as claimed in claim 1, wherein the aberration distance is a distance between a focus position corresponding to the optimal visual field rate of the first distinct curve and a focus position corresponding to junction of the first and second distinct curves; and the method further comprises performing an image correction step on the first and second images before capturing the first image capture region of the first image and the second image capture region of the second image and synthesizing the image capture two regions into the third image; and the image correction step comprises:
   picking up at least one first characteristic of the first image;
   picking up at least one second characteristic of the second image;
   comparing coordinates of the first characteristics and the second characteristics; and
   correcting position of the second image to make the coordinates of the second characteristics identical to those of the first characteristics if the coordinate of at least one characteristic is different.

11. The aberration compensation method for DC as claimed in claim 1, wherein the first and second distinct curves are modulation transfer function (MTF) curves; and the method further comprises performing an image correction step on the first and second images before capturing the first image capture region of the first image and the second image capture region of the second image and synthesizing the image capture two regions into the third image; and the image correction step comprises:
   picking up at least one first characteristic of the first image;
   picking up at least one second characteristic of the second image;
   comparing coordinates of the first characteristics and the second characteristics; and
   correcting position of the second image to make the coordinates of the second characteristics identical to those of the first characteristics if the coordinate of at least one characteristic is different.

12. The aberration compensation method for DC as claimed in claim 1, wherein the aberration distance is a distance between a focus position corresponding to the optimal visual field rate of the first distinct curve and a focus position corresponding to junction of the first and second distinct curves; the first and second distinct curves are modulation transfer function (MTF) curves; and the method further comprises performing an image correction step on the first and second images before capturing the first image capture region of the first image and the second image capture region of the second image and synthesizing the image capture two regions into the third image; and the image correction step comprises:
   picking up at least one first characteristic of the first image;
   picking up at least one second characteristic of the second image;
   comparing coordinates of the first characteristics and the second characteristics; and
   correcting position of the second image to make the coordinates of the second characteristics identical to those of the first characteristics if the coordinate of at least one characteristic is different.

13. An aberration compensation method for DC, comprising:
   using an optical lens to project light beams of an object to be shot;
   using a photosensitive element to receive the light beams refracted by the optical lens at a first focus position corresponding to the light beams at axial center projected by the optical lens, so as to generate a first image;
   moving the photosensitive element to a second focus position corresponding to the light beams at axial periphery projected by the optical lens to receive the light beams refracted by the optical lens, so as to generate a second image;
   respectively calculating a first image capture region corresponding to the first image and a second image capture region corresponding to the second image according to the first focus position and the second focus position;
   performing an image correction step on the first and second images, wherein the image correction step comprises:
      picking up at least one first characteristic of the first image;
      picking up at least one second characteristic of the second image;
      comparing coordinates of the first characteristics and the second characteristics; and
      correcting position of the second image to make the coordinates of the second characteristics identical to those of the first characteristics if the coordinate of at least one characteristic is different; and
   capturing the first image capture region of the first image and the second image capture region of the second image, and synthesizing the two image capture regions into a third image.

14. The aberration compensation method for DC as claimed in claim 13, wherein the optical lens is-a spherical lens or an aspheric lens.

15. The aberration compensation method for DC as claimed in claim 13, further comprising a step of triggering a drive motor with a trigger sensor, so as to move the photosensitive element to the first focus position or the second focus position.

16. The aberration compensation method for DC as claimed in claim 15, wherein the drive motor is an ultrasonic motor.

17. The aberration compensation method for DC as claimed in claim 15, wherein the trigger sensor is a piezoelectric sensor.

* * * * *